(12) United States Patent
Bialer et al.

(10) Patent No.: US 11,860,263 B2
(45) Date of Patent: Jan. 2, 2024

(54) VARIABLE CODE SEQUENCES FOR RADAR TRANSMISSION

(71) Applicant: GM GLOBAL TECHNOLOGY OPERATIONS LLC, Detroit, MI (US)

(72) Inventors: Oded Bialer, Petah Tivak (IL); Amnon Jonas, Jerusalem (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 277 days.

(21) Appl. No.: 17/136,430

(22) Filed: Dec. 29, 2020

(65) Prior Publication Data

US 2022/0206132 A1    Jun. 30, 2022

(51) Int. Cl.
*G01S 13/32* (2006.01)
*G01S 7/35* (2006.01)

(52) U.S. Cl.
CPC ............ *G01S 13/325* (2013.01); *G01S 7/354* (2013.01); *G01S 7/356* (2021.05)

(58) Field of Classification Search
None
See application file for complete search history.

(56) References Cited

U.S. PATENT DOCUMENTS

| 2013/0147655 A1* | 6/2013 | Kishigami | G01S 13/284 342/135 |
| 2014/0085128 A1* | 3/2014 | Kishigami | G01S 13/42 342/147 |
| 2019/0377083 A1* | 12/2019 | Koerber | G01S 7/0234 |

* cited by examiner

*Primary Examiner* — Whitney Moore
(74) *Attorney, Agent, or Firm* — CANTOR COLBURN LLP

(57) ABSTRACT

A system for detecting and estimating a property of an object based on radar includes a signal generator configured to generate a code sequence for a plurality of transmitters configured to emit radar signals over a selected time frame, the code sequence including a plurality of codes, each code of the plurality of codes having a different code length, each code repeated in the code sequence according to a repetition frequency, and each transmitter configured to emit a radar signal based on the code sequence. The system also includes a receiver configured to detect return signals from reflections of the emitted radar signal, and a processing device configured to estimate a property of an object based on the detected return signals.

17 Claims, 7 Drawing Sheets

VARIABLE CODE SEQUENCES FOR RADAR TRANSMISSION

INTRODUCTION

The subject disclosure relates to detection of objects and estimation of object properties using radar. More specifically, the subject disclosure relates to code sequencing for radar transmissions.

Vehicles (e.g., automobiles, trucks, aircraft, construction equipment, farm equipment, automated factory equipment) are increasingly equipped with detection systems for monitoring surrounding environments. Radar systems may be used for detection and tracking of objects, for example, to avoid obstacles. Radar devices may be used in vehicles to alert a driver or user and/or to take evasive action. Detection and tracking systems are also useful in autonomously operated vehicles.

Some radar systems, such as multi-input-multi-output (MIMO) radar systems, utilize multiple transmitters that simultaneously or concurrently emit coded radar signals. Detected return signals thus include reflections from multiple transmissions. As such, it is desirable to be able to accurately separate contributions from individual transmitters in order to accurately detect an object using radar.

SUMMARY

In one exemplary embodiment, a system for detecting and estimating a property of an object based on radar includes a signal generator configured to generate a code sequence for a plurality of transmitters configured to emit radar signals over a selected time frame, the code sequence including a plurality of codes, each code of the plurality of codes having a different code length, each code repeated in the code sequence according to a repetition frequency, and each transmitter configured to emit a radar signal based on the code sequence. The system also includes a receiver configured to detect return signals from reflections of the emitted radar signal, and a processing device configured to estimate a property of an object based on the detected return signals.

In addition to one or more of the features described herein, each code includes a series of associated symbols, and the code length is based on a number of the associated symbols.

In addition to one or more of the features described herein, each code is generated by randomly or pseudo-randomly selecting the series of associated symbols.

In addition to one or more of the features described herein, the code length of a shortest code of the plurality of codes is selected to be greater than or equal to a number of the plurality of transmitters.

In addition to one or more of the features described herein, each pair of adjacent codes have code lengths that do not have a common divider.

In addition to one or more of the features described herein, the plurality of transmitters are configured to simultaneously emit radar signals according to the code sequence.

In addition to one or more of the features described herein, the processing device is configured to transform the detected return signals and generate a Doppler frequency spectrum.

In addition to one or more of the features described herein, the Doppler frequency spectrum includes ambiguous frequency peaks for each transmitter, the ambiguous frequency peaks being separated due to the code sequence, and estimating the property includes identifying and disregarding the ambiguous frequency peaks.

In addition to one or more of the features described herein, the plurality of transmitters are configured as multi-input-multi-output (MIMO) transmitters.

In one exemplary embodiment, a method of detecting and estimating a property of an object based on radar includes generating, by a signal generator, a code sequence for a plurality of transmitters configured to emit radar signals over a selected time frame, the code sequence including a plurality of codes, each code of the plurality of codes having a different code length, each code repeated in the code sequence according to a repetition frequency. The method also includes emitting a radar signal from each transmitter based on the code sequence, detecting, by a receiver, return signals from reflections of the emitted radar signals, and estimating a property of an object based on the detected return signals.

In addition to one or more of the features described herein, each code includes a series of associated symbols, and the code length is based on a number of the associated symbols.

In addition to one or more of the features described herein, each code is generated by randomly or pseudo-randomly selecting the series of associated symbols.

In addition to one or more of the features described herein, the code length of a shortest code of the plurality of codes is selected to be greater than or equal to a number of the plurality of transmitters.

In addition to one or more of the features described herein, the plurality of transmitters simultaneously emit radar signals according to the code sequence.

In addition to one or more of the features described herein, estimating the property includes transforming the detected return signals and generating a Doppler frequency spectrum.

In addition to one or more of the features described herein, the Doppler frequency spectrum includes ambiguous frequency peaks for each transmitter, the ambiguous frequency peaks being separated due to the code sequence, and estimating the property includes identifying and disregarding the ambiguous frequency peaks.

In one exemplary embodiment, a vehicle system includes a memory having computer readable instructions, and a processing device for executing the computer readable instructions. The computer readable instructions control the processing device to perform generating, by a signal generator, a code sequence for a plurality of transmitters configured to emit radar signals over a selected time frame, the code sequence including a plurality of codes, each code of the plurality of codes having a different code length, each code repeated in the code sequence according to a repetition frequency. The instructions control the processing device to also perform emitting a radar signal from each transmitter based on the code sequence, detecting, by a receiver, return signals from reflections of the emitted radar signals, and estimating a property of an object based on the detected return signals.

In addition to one or more of the features described herein, each code includes a series of associated symbols, the code length is based on a number of the associated symbols, and the code length is selected to be greater than a number of the plurality of transmitters.

In addition to one or more of the features described herein, each code is generated by randomly or pseudo-randomly selecting the associated symbols.

In addition to one or more of the features described herein, the plurality of transmitters are configured to simultaneously emit radar signals according to the code sequence.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
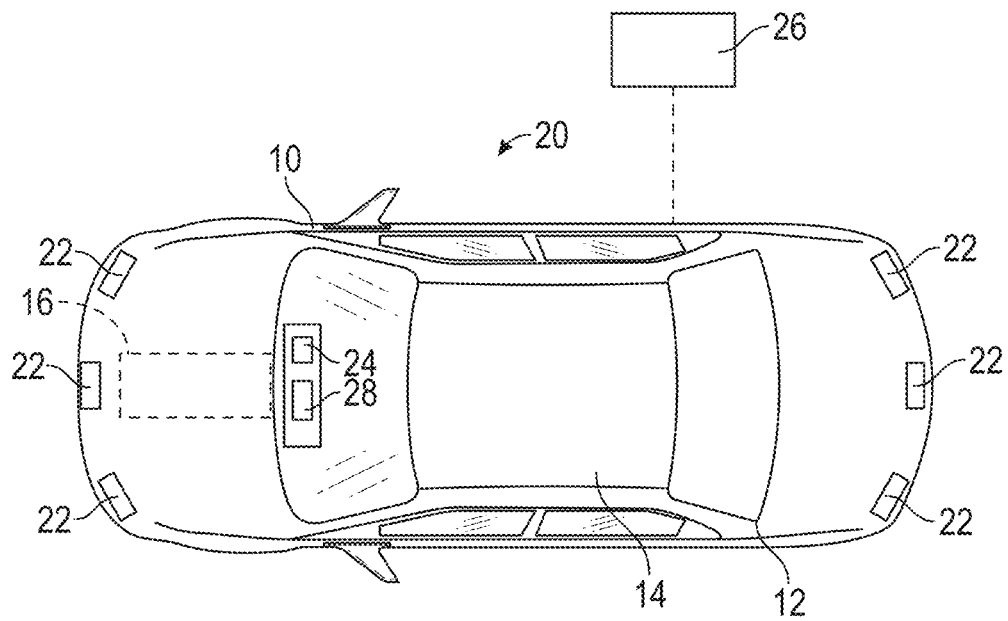
FIG. 1 is a top view of a motor vehicle including a radar system.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods and systems for radar detection and position estimation are described herein. An embodiment of a radar system is configured to estimate a position and/or velocity of an object. An object may be any feature or condition that reflects transmitted radar signals. The radar system may be included in or connected to a vehicle for detection of objects such as road features, road obstructions, other vehicles, trees, people and others. The radar system is not limited to use with vehicles, and may be used in any context (e.g., weather, aviation and others).

The radar system is configured to transmit radar signals from a series or plurality of transmitters based on generated code sequences. In one embodiment, the transmitters are configured to simultaneously emit a respective radar signal, for example, as part of a MIMO system.

An embodiment of a method of coding transmission signals and/or performing radar detection and object property estimation includes generating a sequence of repeated codes, which is applied to each transmitter for transmission of an encoded radar signal. Each code in the sequence is repeated and has a number of repetitions that is at least as high as the number of transmitters. The code sequence is a variable code sequence, in that the length of each code is different than the length of the other codes within the code sequence. For example, the code sequence includes at least a first code having a first code length, which is repeated in the sequence according to a selected number of repetitions. A second code in the sequence has a code length that is different than the code length of the first code, and the second code is repeated in the sequence according to a selected number of repetitions. Additional codes may be successively added to the code sequence. The length of each code is selected, in one embodiment, to reduce or minimize overlap between replicas of codes, so that ambiguities can be reduced and/or resolved.

Embodiments described herein present a number of advantages. For example, signals transmitted using the coding scheme described herein allow for effective separation of return signals associated with multiple transmitters. Conventional radar techniques utilizing MIMO systems can suffer from ambiguities due to large numbers of transmitters transmitting coded signals over a single time frame. Embodiments described herein provide for radar systems with multiple transmitters that are robust to Doppler ambiguity.

FIG. 1 shows an embodiment of a motor vehicle 10, which includes a vehicle body 12 defining, at least in part, an occupant compartment 14. The vehicle body 12 also supports various vehicle subsystems including an engine assembly 16, and other subsystems to support functions of the engine assembly 16 and other vehicle components, such as a braking subsystem, a steering subsystem, a fuel injection subsystem, an exhaust subsystem and others.

The vehicle 10 includes aspects of a radar system 20 for detecting and tracking objects, which can be used to alert a user, perform avoidance maneuvers, assist the user and/or autonomously control the vehicle 10. The radar system 20 includes one or more radar sensing assemblies 22, each of which may include one or more transmit elements and/or one or more receive elements. The vehicle 10 may incorporate a plurality of radar sensing assemblies disposed at various locations and having various angular directions.

For example, each radar sensing assembly 22 includes a transmit portion and a receive portion. The transmit and receive portions may include separate transmit and receive antennas or share one or more antennas in a transceiver configuration. Each radar sensing assembly 22 may include additional components, such as a low pass filter (LPF) and/or a controller or other processing device.

In one embodiment, the radar sensing assembly 22 includes multiple transmitters and one or more receivers. For example, the radar sensing assembly is configured as a multi-input and multi-output (MIMO) transmitter/receiver assembly.

The radar sensing assemblies 22 communicate with one or more processing devices, such as processing devices in each assembly and/or a remote processing device such as an on-board processor 24 and/or a remote processor 26. The remote processor 26 may be part of, for example, a mapping system or vehicle diagnostic system. The vehicle 10 may also include a user interaction system 28 and other components such as a GPS device.

The radar system 20 is configured generally to acquire radar signals and analyze the radar signals to detect an object and estimate one or more properties of the object. Examples of such properties include position, angle, velocity and/or acceleration. The position and/or velocity are estimated (e.g., by integrating acquired signal pulses over a selected time frame).

Figure 2:
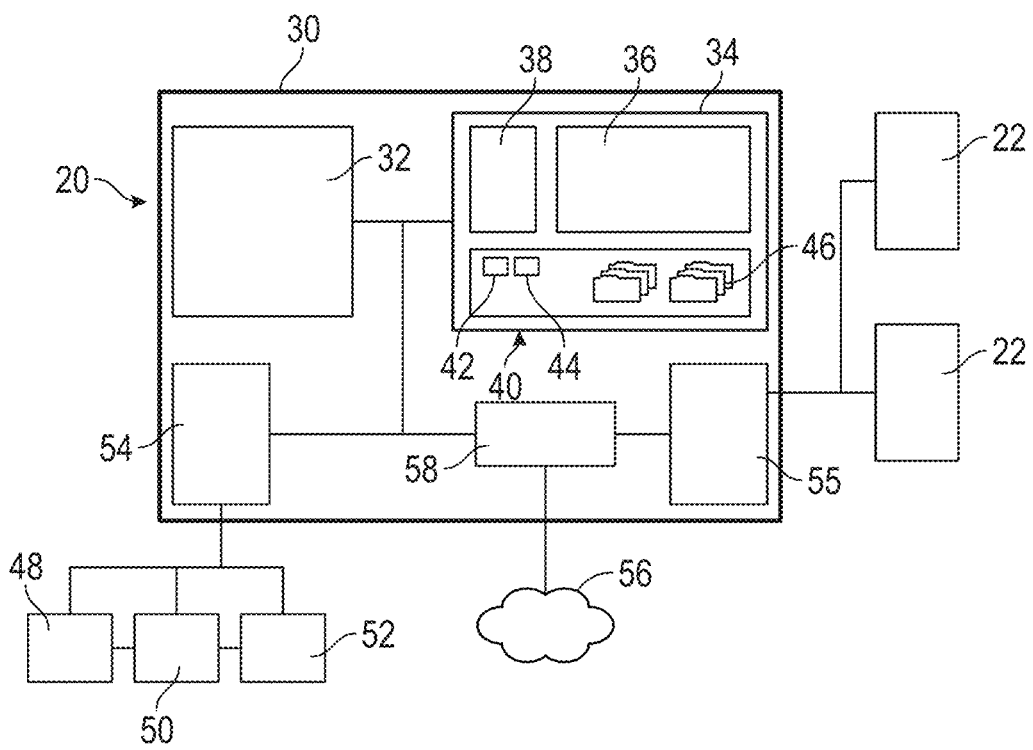
FIG. 2 depicts a radar system, in accordance with an exemplary embodiment.

FIG. 2 illustrates aspects of an embodiment of a computer system 30 that is in communication with or is part of the radar system 20, and that can perform various aspects of embodiments described herein. The computer system 30 includes at least one processing device 32, which generally includes one or more processors for performing aspects of radar detection and analysis methods described herein. The processing device 32 can be integrated into the vehicle 10, for example, as the on-board processor 24, or can be a processing device separate from the vehicle 10, such as a server, a personal computer or a mobile device (e.g., a smartphone or tablet). For example, the processing device 32 can be part of, or in communication with, one or more engine control units (ECU), one or more vehicle control modules, a cloud computing device, a vehicle satellite communication system and/or others. The processing device 32 may be configured to perform radar detection and analysis methods described herein, and may also perform functions related to control of various vehicle subsystems.

Components of the computer system 30 include the processing device 32 (such as one or more processors or processing units) and a system memory 34. The system memory 34 may include a variety of computer system readable media. Such media can be any available media that is accessible by the processing device 32, and includes both volatile and non-volatile media, removable and non-removable media.

For example, the system memory 34 includes a non-volatile memory 36 such as a hard drive, and may also include a volatile memory 38, such as random access memory (RAM) and/or cache memory. The computer system 30 can further include other removable/non-removable, volatile/non-volatile computer system storage media.

The system memory 34 can include at least one program product having a set (e.g., at least one) of program modules that are configured to carry out functions of the embodiments described herein. For example, the system memory 34 stores various program modules 40 that generally carry out the functions and/or methodologies of embodiments described herein. For example, a signal generation module 42 may be included to perform functions related to generating code sequences and transmission of radar signals, and an analysis module 44 may be included to perform functions related to acquiring and processing received signals, and/or position estimation and range finding. The system memory 34 may also store various data structures 46, such as data files or other structures that store data related to radar detection and analysis. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 32 can also communicate with one or more external devices 48 such as a keyboard, a pointing device, and/or any devices (e.g., network card, modem, etc.) that enable the processing device 32 to communicate with one or more other computing devices. In addition, the processing device 32 can communicate with one or more devices that may be used in conjunction with the radar system 20, such as a Global Positioning System (GPS) device 50 and a camera 52. The GPS device 50 and the camera 52 can be used, for example, in combination with the radar system 20 for autonomous control of the vehicle 10. Communication with various devices can occur via Input/Output (I/O) interfaces 54.

The processing device 32 may also communicate with one or more networks 56 such as a local area network (LAN), a general wide area network (WAN), and/or a public network (e.g., the Internet) via a network adapter 58. It should be understood that although not shown, other hardware and/or software components could be used in conjunction with the computer system 30. Examples include, but are not limited to: microcode, device drivers, redundant processing units, external disk drive arrays, RAID systems, and data archival storage systems, etc.

Figure 3:
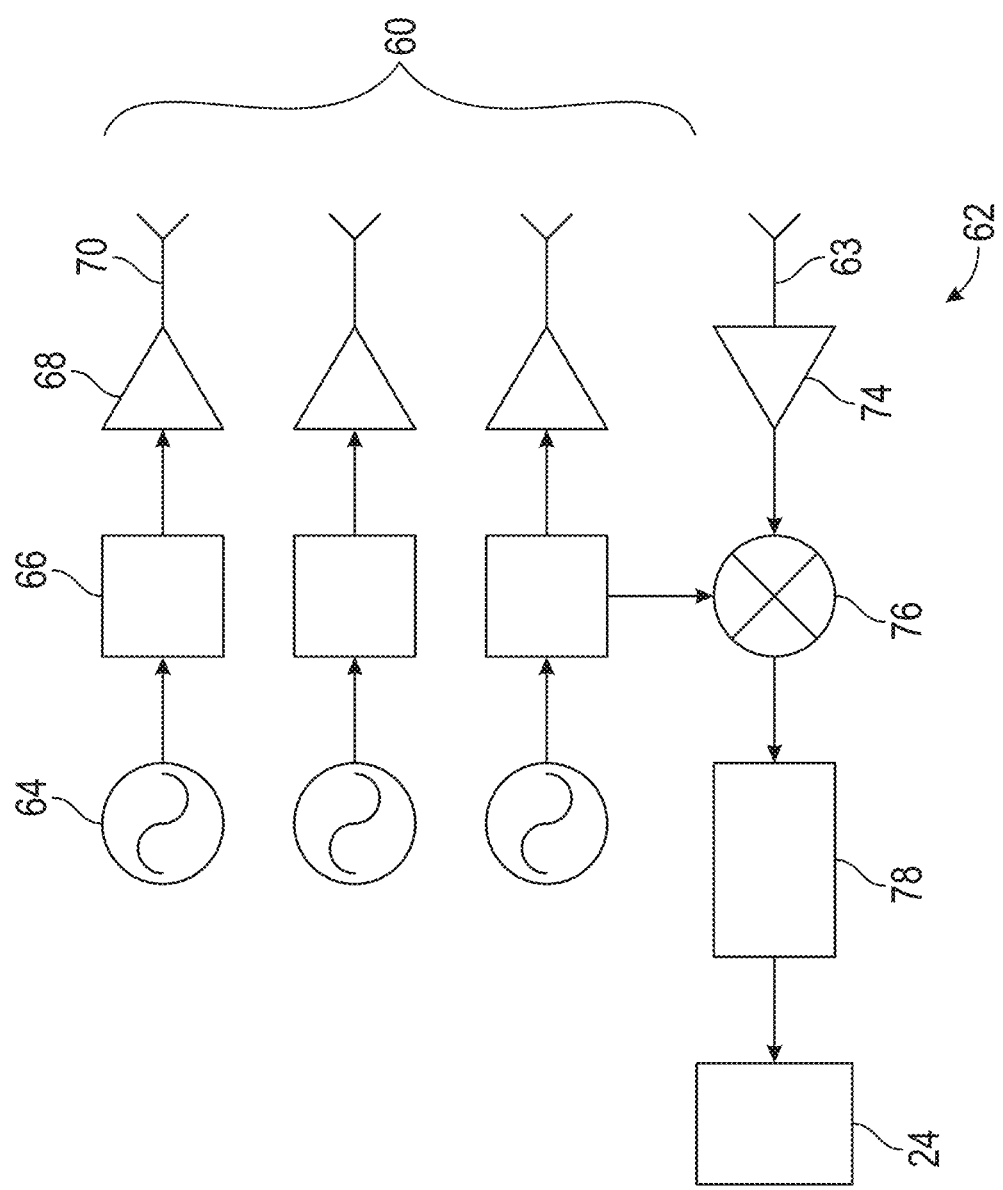
FIG. 3 depicts a multiple transmitter radar assembly, in accordance with an exemplary embodiment.

FIG. 3 depicts an example of a transmitter/receiver array, which may be part of a radar sensing assembly 22, but is not so limited. In this example, the array is part of a multi-input and multi-output (MIMO) assembly, which includes a set of transmitters 60 and a set of receivers 62. In various embodiments, the MIMO assembly can include a set of transducers, with each transducer serving as both a transmitter and a receiver. The transmitter/receiver array is shown as having one receiver 62, however the transmitter/receiver array can have any number of receivers 62.

Each transmitter includes a signal generator 64, a trigger circuit 66, an amplifier 68 and a transmitter antenna 70. The signal generator 64 generates an RF pulse sequence for transmission. The pulse sequence is encoded such that each transmitter antenna 70 emits a signal encoded with various codes.

The RF pulse sequence, in one embodiment, is a linear frequency modulated (LFM) signal, also known as a chirp signal, in which the frequency of the signal increases from a first frequency to a second frequency over the duration of the signal in a linear fashion. The trigger circuit 66 provides the chirp signal to the transmitter antenna 70 according to a time schedule. In various embodiments, the trigger circuits of the transmitters are synchronized for time-division multiplexing of its transmitted signals.

A coded signal from the trigger circuit 66 is amplified at the amplifier 68 and provided to transmitter antenna 70 which propagates the signal. Return signals reflected from the surrounding environment are received by the receiver 62. A receiver antenna 63 receives reflections from various objects in the environment, and provides the signal to an amplifier 74. The amplified signal is provided to a multiplexer circuit 76, which is synchronized with the trigger circuit 66 in order to establish a phase relation between the set of transmitters 60 and the receiver(s) 62. The amplified and synchronized signal is then input to an analog-to-digital (A/D) converter 78.

Transmitters (Tx) can be configured to transmit radar signals according to any suitable transmission regime. Examples of such regimes include time-division multiplexing (TDMS) and code division multiple access (CDMA) transmission regimes.

Figure 4:
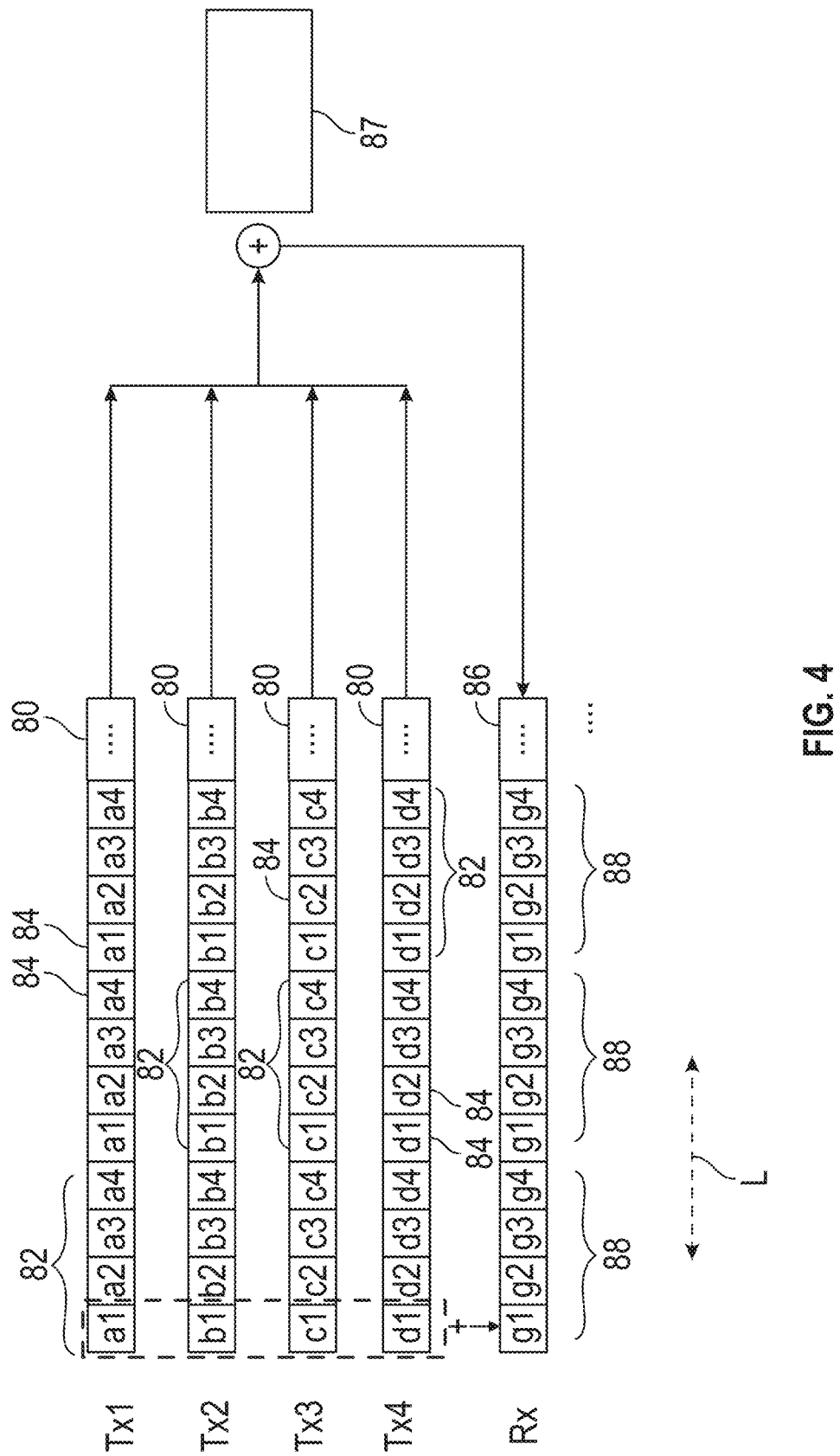
FIG. 4 depicts an example of conventional code sequences generated for a plurality of transmitters.

FIG. 4 shows an example of conventional transmission sequences that are emitted simultaneously (or with a fixed phase difference) by each of a plurality of transmitters Tx (e.g., a MIMO array). The plurality of transmitters Tx include a number N of transmitters Txi, denoted as Tx1, . . . , TxN. Each transmitter Txi receives signals from a code generator and emits a radar signal that is encoded according to a respective code sequence 80. The code sequence 80 includes a number Q of successive repetitions of a code 82, denoted as $S_i$. The code sequence 80 can be represented by Q repetitions of a code $S_i$ (codes $S_i^1, \ldots, S_i^Q$) in sequence.

Each code 80 may be configured as a "code group" including a number of individual code elements or sub-codes. The sub-codes are referred to herein as "symbols." For example, each transmitter Txi transmits a chirped signal according to a respective code sequence 80, which includes a code 82 having a series of symbols 84. The number of symbols 84 in each code 82 is selected to be greater than or equal to the number of transmitters. A "code" or "symbol" can be expressed as a selected waveform or other property of a transmission signal.

For example, the code 82 for transmitter Tx1 is made up of four symbols 84 denoted as a1, . . . a4, and the code 82 for transmitter Tx2 is made up of four symbols 84 denoted as b1, . . . b4. The code 82 for transmitter Tx3 is made up of four symbols 84 denoted as c1, . . . c4, and the code 82 for transmitter Tx4 is made up of four symbols 84 denoted as d1, . . . d4. The repetition rate is based on the temporal length (also referred to simply as "length") of the code 82, the length of the individual symbols 84 and the transmission time frame.

The transmitted signals are reflected, and combined reflected signals are received at a receiver Rx. In the example of FIG. 4, the receiver Rx detects a sequence 86 of reflected signals. For example, signals corresponding to symbols a1, b1, c1 and d1 reflect at a reflecting object 87 and combine to generate a received signal g1. This process continues to generate a series of combined signals 88 making up the sequence 86, each of which includes a series of repeated symbols g1, g2, g3 and g4.

Although only four transmitters and code sequences are shown, the assembly can include any number of transmitters. Generally, higher numbers of transmitters can lead to ambiguity issues realized by high side lobes and lower resolutions.

Conventionally, the codes 82 transmitted by each transmitter are of equal code length. For example, the code length of each code 82 is the same and equal to the number of transmitters (which in this example is four) multiplied by the length of each symbol. As the number of transmitters increase, and the number of symbols increases, the number Q of repetitions decreases. Therefore, the code repetition rate is 1/(code sequence length). In the example of FIG. 4, the repetition rate is 1/(4*symbol length) Such reduced repetition rates can lead to ambiguities that are difficult to resolve.

MIMO radar is an efficient technique to increase the angular resolution with multiple transmissions. However, the multiple transmissions cause challenges such as Doppler ambiguity. The Doppler ambiguity issue becomes more severe as the number of transmitters increases and is apparent, for example, in time-division multiplexing (TDMS) and code division multiple access (CDMA) transmissions.

The ambiguity issue is realized by high side-lobes in calculated Doppler spectra.

Embodiments described herein present a solution to the above challenge by providing for a variable length coding scheme for MIMO and/or other multiple transmitter radar systems. An embodiment of a method of detecting and estimating a property of an object includes constructing a code sequence including a plurality of codes. Each code in the sequence is generated by determining a number of symbols (e.g. by a random number generator). Each code has a number of symbols that is greater than or equal to a number of transmitters, and each code has a different code length (e.g., number of symbols, or length of individual symbols).

The method partitions a long sequence into blocks of symbols, where each block is collectively referred to herein as a "code." The length of the code is varied by varying the number of symbols in a code or block, and/or varying the length of individual symbols.

The structured variations of the code lengths result in low side-lobes in the Doppler spectrum, and thus robustness to Doppler ambiguity issues, which is a major challenge in MIMO radar. Embodiments provide a solution in the form of, for example, the ability to use a large number of transmitters that is robust to Doppler ambiguity.

Figures 5, 6:
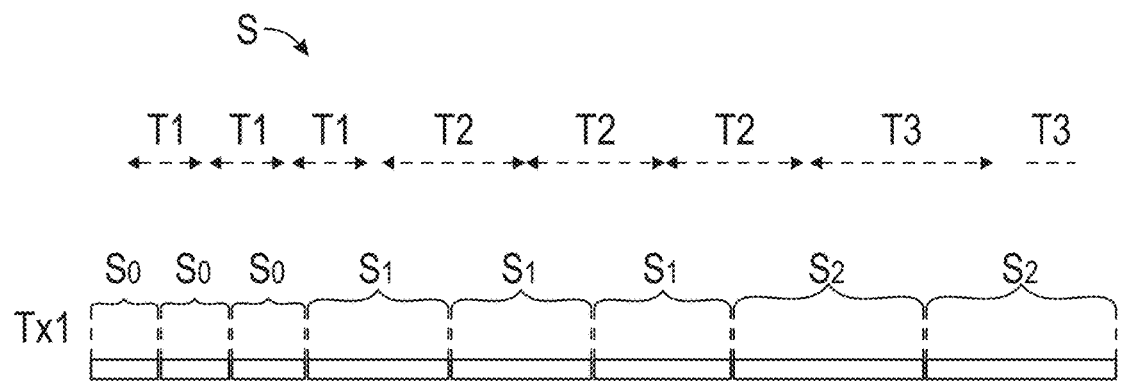
FIG. 5 depicts an example of a code sequence generated according to exemplary embodiments.
FIG. 6 depicts an example of a matrix used to generate the code sequence of FIG. 5.

An example of a code sequence S having varying code lengths is shown in FIG. 5. The code sequence S is applied to a plurality of transmitters for transmission of a measurement signal. In this example, the code sequence S includes three different code lengths (durations). A first code $S_0$ has a first code length T1, a second code $S_1$ has a second code length T2, and a third code $S_2$ has a third code length T3. In this example, the first code length T1 is shorter than the second code length T2, and the second code length is shorter than the third code length T3 (i.e., T1<T2<T3). The code length may be defined by the number of symbols in a code. For example, the shortest code $S_0$ has a number of symbols that is greater than or equal to the number of transmitters. As shown, each code is repeated three times. It is noted that the number and length of codes shown in FIG. 5, as well as the number of repetitions, is not intended to be limiting.

An embodiment of a method of generating a code sequence for a multiple transmitter radar system is described as follows. The method includes generating a number M of groups of random symbols, where M is at least equal to the number N of transmitters Tx in the system. In one embodiment, the codes and/or symbols are generated by using a random or pseudorandom series of codes or symbols (e.g., a pseudo-random bit sequence (PRBS)). Each group constitutes a sequence or code $S_i$, where i is a number from zero to M−1. The code $S_i$ has a code length $N_i$, which may be equal to the length of the symbols multiplied by the number of symbols. The code length is different for each sequence $S_i$.

The result is a sequence S of codes $S_i$. The code sequence S is transmitted by all of the transmitters.

The code sequence S can be represented as a matrix for each code 5. Each matrix is referred to as a "code matrix" or "$S_i$ matrix," where i is an index of the code matrix.

An example of an $S_i$ matrix or code matrix 600 is shown in FIG. 6. The Si matrix defines a code Si, and has a row for each transmitter Tx1-Tx4. Each row is populated with a series of symbols, thereby defining a plurality of columns. The number of columns is selected based on a desired code length, and is at least as high as the number of transmitters. In the $S_i$ matrix 600 of FIG. 6, a first column includes symbols a1, b1, c1 and d1, a second column includes symbols a2, b2, c2 and d2, a third column includes symbols a3, b3, c3 and d3, and a fourth column includes symbols a4, b4, c4 and d4. The dimensions of the Si matrix 600 are ($N_{Tx}$,$N_i$), where $N_{Tx}$ is a number of transmitters Tx, and $N_i$ is the code length of the i-th code (or code group).

In an embodiment, the code lengths $N_i$ are set so that there is minimal overlap between the replicas of all codes. This is obtained by having the code length $N_i$ (e.g., the number of symbols) be equal or greater than the number of transmitters ($N_i \geq N_{Tx}$), to ensure the invertibility of each symbol. Another condition may be that all pairs of adjacent codes $S_i$ (for i=1 through M) have code lengths that do not have a common divider.

The repetition number is denoted as Q, where Q equals the total number of sub-groups or symbols divided by M Each code $S_i$ is thus repeated Q times. This repetition is realized through a final or overall code sequence 5, which in an embodiment includes individual codes denoted by symbol $S^j_i$, where i is the code index number and j is a repetition index representing a repetition number (i.e., a number of repetitions). Thus, there are M code matrices $S_1, S_2, \ldots, S_M$, where each code matrix is repeated Q times. An example of an overall code sequence for M codes, where each code matrix is repeated Q times, follows:

$$S = S^1_1, S^2_1, \ldots, S^Q_1, S^1_2, S^2_2, \ldots, S^Q_2, S^1_M, S^2_N, \ldots, S^Q_M.$$

Return signals Y based on reflections of radar signals encoded using the above sequence can be represented as:

$$Y = a_{Rx}(\theta) a_{Tx}^T(\theta) S,$$

where $a_{Rx}(\theta)$ is the response of each receiver Rx to an angle $\theta$. $a^T_{Tx}(\theta)$ is the Tx response to the angle $\theta$, and S represents a code sequence matrix.

Figure 7:
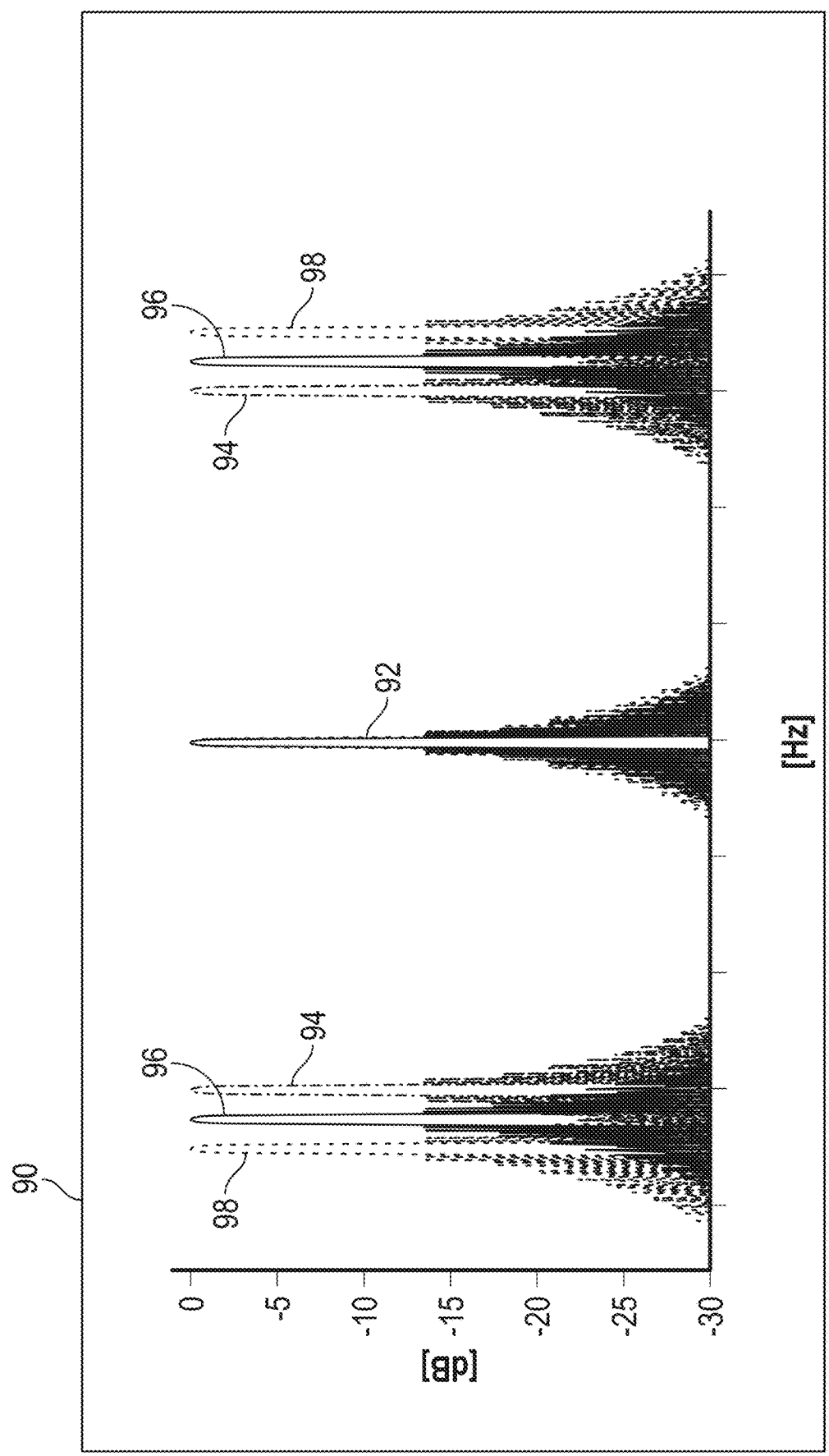
FIG. 7 depicts an example of a Doppler spectrum estimated from reflections of radar transmission signals generated according to the code sequence of FIG. 5.

FIG. 7 shows an example of a Doppler spectrum 90 generated from processing of return signals reflected from MIMO transmissions encoded according to the code sequence of FIG. 5. As shown, there are peaks at various Doppler frequencies. The correct peak is denoted as peak 92, which is a combination of individual peaks 94, 96 and 98 associated with code sequence intervals T1, T2 and T3, respectively. Due to the varying code lengths in the code sequence, ambiguous peaks exist but they are at different frequencies. As a result, the Doppler spectrum at the correct frequency constructs at the correct frequencies and destructs at the incorrect (ambiguous) frequencies.

Figure 8:
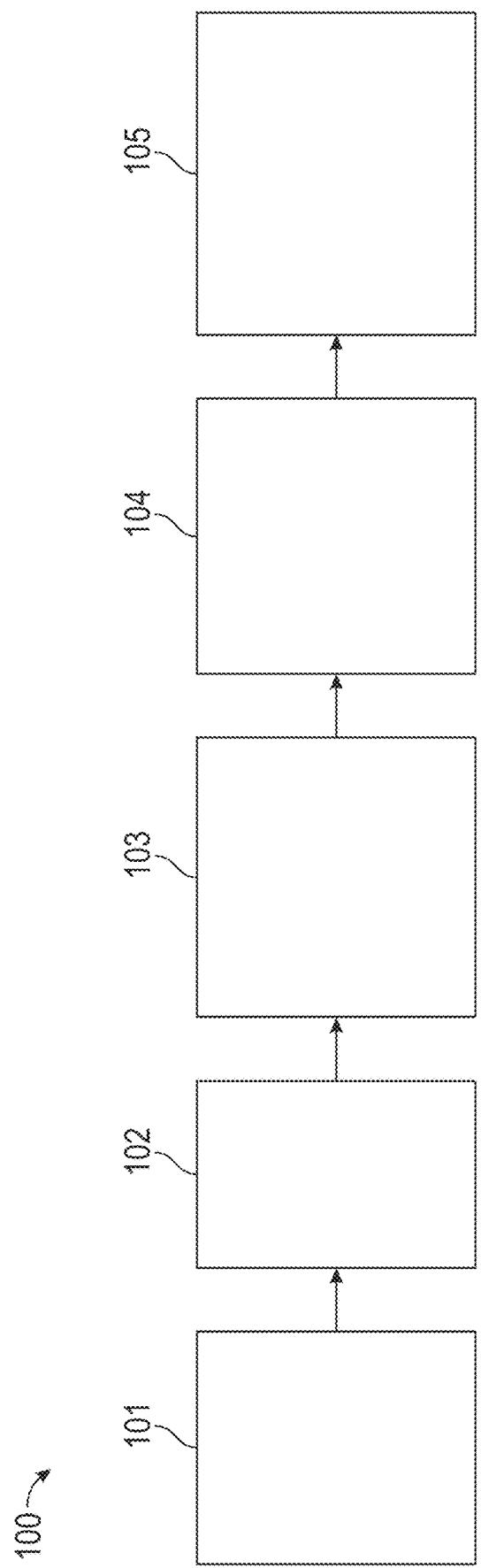
FIG. 8 is a flowchart depicting a method of detecting an object and estimating an object position, direction and/or velocity using a radar system, in accordance with an exemplary embodiment.

FIG. 8 illustrates aspects of an embodiment of a computer-implemented method 100 of radar detection and analysis, and object property estimation, which includes detecting an object and estimating an object property (e.g., location or position, direction and/or velocity). The method 100 may be performed by a processor or processors disposed in a vehicle (e.g., processing device 32, as an ECU or on-board computer) and/or disposed in a device such as a smartphone, tablet or smartwatch. The method 100 is discussed in conjunction with the radar system 20 of FIG. 1 and components shown in FIG. 2 for illustration purposes. It is noted that aspects of the method 100 may be performed by any suitable processing device or system.

The method 100 includes a plurality of stages or steps represented by blocks 101-105, all of which can be performed sequentially. However, in some embodiments, one or more of the stages can be performed in a different order than that shown or fewer than the stages shown may be performed.

At block 101, a code sequence S is generated (e.g., by the signal generation module 42 and/or the signal generator 64) by selecting a series of random or pseudo-random symbols (e.g., the symbols of FIG. 6) that make up each code $S_i$. The length of the code sequence S is the same for each transmitter Tx. The rows of matrix S are transmitted from each transmitter Tx as a sequence of code symbols. As each row is the same length, the total number of symbols transmitted from each transmitter is the same. The length and repetition rate of the code sequence S is selected as discussed above. In one embodiment, each code $S_i$ has a different number of symbols. Thus, the length of each code $S_i$ may be expressed as a number of symbols.

For example, a processing device selects a length for each code $S_i$, and populates a matrix or other data structure (e.g., the matrix of FIG. 6) with random or pseudo-random symbols. The number of symbols in each code $S_i$ varies within the sequence.

The coding method partitions a long sequence into blocks of symbols, where the code length varies from one block to the other. The structured variations of the code length result in low side-lobes in the Doppler spectrum, and thus provide robustness to Doppler ambiguity issues. Therefore, embodiments described herein are advantageous at least because of this robustness, as ambiguity issues represent a major challenge in conventional MIMO radar.

At block 102, radar signals are transmitted by the transmitters Tx according to the code sequence. Each transmitter Tx transmits radar signals having a series of pulses. As described herein, "pulses" refer to a series of repeating waveforms, which are not limited to those described herein. In one embodiment, the transmit element transmits a linear frequency-modulated continuous wave (LFM-CW) signal. This signal may be referred to as a "chirp signal," and each pulse may be referred to as a "chirp."

Each transmitter transmits (e.g., simultaneously) a signal according to the same code sequence S. For example, each transmitter repeats a first code by a selected number of repetitions Q, repeats a second code by Q repetitions, and successively repeats and transmits subsequent codes. As the codes have different lengths, the code length within the sequence changes for all the transmitters simultaneously.

A return signal is detected or measured by one or more receive elements as a measurement signal. For example, analog signals detected by the receive elements are sampled and converted to digital signals, referred to herein as detection signals. The return signal Y includes a series of reception signals $Y^j_i$, the reception signal corresponding to a reflection of the emitted signal symbol $S^j_i$ is shown as:

$$Y = Y^1_1, \ldots, Y^Q_1, Y^1_2, \ldots, Y^1_M, \ldots, Y^Q_M.$$

Each reception signal $Y^j_i$ corresponds to a reflection of an emitted signal symbol $S^j_i$. The total matrix of received symbols is:

$$Y^j_i = a_{Rx}(\theta) a_{Tx}^T(\theta) S^j_i,$$

where $a_{Rx}(\theta)$ is an Rx array response for an angle $\theta$, and $a^T_{Tx}(\theta)$ is a transmitter array response for the angle $\theta$. The dimensions of $Y^j_i$ are $(N_{Rx}, N_{Tx})$, where $N_{Rx}$ and $N_{Tx}$ are the number of receivers Rx and transmitters Tx, respectively. The dimensions of $S^j_i$ are $(N_{Tx}, N_i)$.

At block 103, a processing device, such as the processor 32, transforms each return pulse into the frequency domain by using a Fourier transform. In one embodiment, the processing device 32 uses a fast Fourier transform (FFT) algorithm (also referred to as "range FFT") to generate range spectra associated with each return pulse. The range FFT is a one-dimensional FFT configured to transform the return pulses into range intensity values that can be used to estimate the range (referred to as the "range domain") of a reflection.

To generate an FFT output, range bins defined by the range FFT are scanned, and range bins corresponding to the same range are extracted from all receive antennas. The result of this extraction is a vector of range bins that has a length equal to the number of receive antennas. The output of the Range FFT for a transmitter i is then multiplied with a decoding matrix (e.g. a pseudo inverse matrix) and the output Zi can be expressed by:

$$z_i = a_{Rx}(\theta) a_{Tx}^T(\theta) = Y^j_i (s^j_i)^H (s^j_i (s^j_i)^H)^{-1}.$$

At block 104, a Doppler frequency spectrum is generated for use in estimating properties such as velocity. In one embodiment, the range and velocity of the object is determined by applying a second Fourier transform to estimate the frequency shift (Doppler frequency) In one embodiment, a processor uses a Discrete Fourier transform (DFT) algorithm ("Doppler DFT") to generate frequency spectra associated with each return pulse, which can be used to estimate a position and velocity value associated with each frequency spectrum. The Doppler DFT output can be expressed as a matrix F.

The output of the Doppler DFT per each transmitter (per range bin), can be represented by:

$$R=UF$$

where R is an output matrix, U is a stacked $Z_i$ matrix (e.g., U=[vec($Z_0$), vec($Z_1$), . . . ]), and F is a DFT matrix.

AT block 105, directional properties are estimated for detected objects. For example, beamforming is performed for each range bin and Doppler DFT bin to generate an angle-range-Doppler matrix W, represented by W=AR, where A=[$v_0,v_1$, . . . ], and $v_i$=vec($a_{Rx}(\theta_i)a^T_{Tx}(\theta_i)$).

Figure 9:
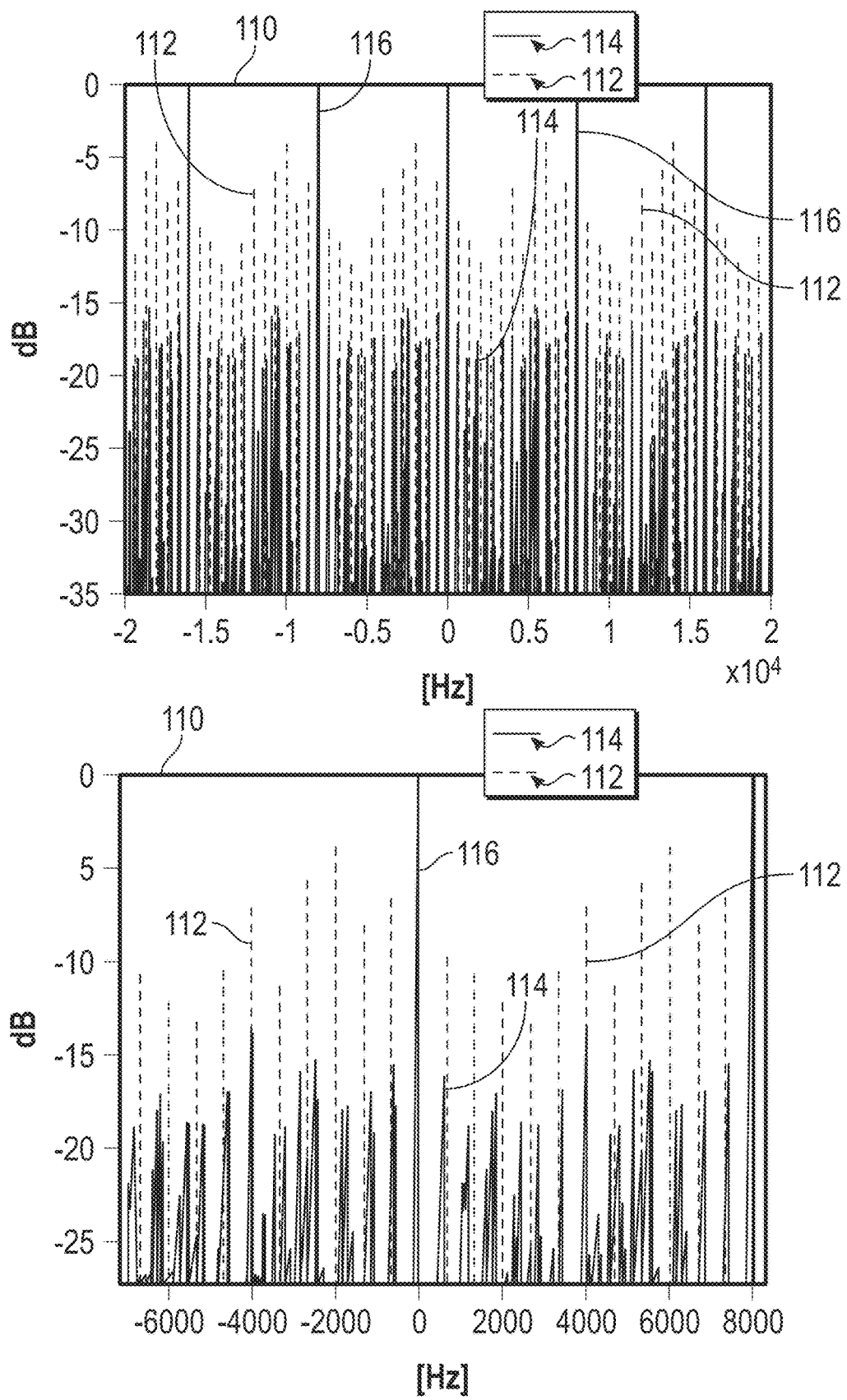
FIG. 9 depicts an example of a Doppler spectrum estimated based on the method of FIG. 8.

FIG. 9 shows an example of a Doppler spectrum 110 generated by the method 100. In this example, there are twelve transmitters Txs and 16 receivers Rxs. Three different code lengths are selected so that the number of symbols in the shortest code is greater than or equal to the number of Txs. In this example, three code lengths are selected (i.e., 13, 14 and 15). Note that the code lengths are expressed as the number of symbols, and that the code lengths do not have a common divisor. Each code in this example, is a pseudo-random bit sequence $e^{j\phi''}$, where $\phi''$ is about U(0,2π).

The Doppler spectrum 110 shows frequency peaks 112 (dashed lines) resulting from a conventional fixed-code method, and also shows frequency peaks 114 resulting from variable coding according to embodiments described herein. The frequency peaks 114 include a repeating, high intensity peak 116 at the correct Doppler frequency. As is evident, the peak 116 has a higher intensity, and ambiguous peaks are of a much lower intensity, so that the correct peak is more easily identifiable. In contrast, the peaks generated by conventional methods have a much lower contrast between peaks and are thus more difficult to analyze and estimate the correct frequency.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system for detecting and estimating a property of an object based on radar, the system comprising:
   a signal generator configured to generate a code sequence for a plurality of transmitters configured to emit radar signals over a selected time frame, the code sequence including a plurality of codes, each code of the plurality of codes having a different code length, each code repeated in the code sequence according to a repetition frequency;
   each transmitter configured to emit a radar signal based on the code sequence, wherein the plurality of transmitters are configured to simultaneously emit radar signals according to the code sequence, and the code length of a shortest code of the plurality of codes is selected to be greater than or equal to a number of the plurality of transmitters;
   a receiver configured to detect return signals from reflections of the emitted radar signals; and
   a processing device configured to estimate a property of an object based on the detected return signals.

2. The system of claim 1, wherein each code includes a series of associated symbols, and the code length is based on a number of the associated symbols.

3. The system of claim 2, wherein each code is generated by randomly or pseudo-randomly selecting the series of the associated symbols.

4. The system of claim 2, wherein the number of the associated symbols of the shortest code of the plurality of codes is selected to be greater than or equal to the number of the plurality of transmitters.

5. The system of claim 4, wherein each pair of adjacent codes have code lengths that do not have a common divider.

6. The system of claim 1, wherein the processing device is configured to transform the detected return signals and generate a Doppler frequency spectrum.

7. The system of claim 6, wherein the Doppler frequency spectrum includes ambiguous frequency peaks for each transmitter, the ambiguous frequency peaks being separated due to the code sequence, and estimating the property includes identifying and disregarding the ambiguous frequency peaks.

8. The system of claim 1, wherein the plurality of transmitters are configured as multi-input-multi-output (MIMO) transmitters.

9. A method of detecting and estimating a property of an object based on radar, the method comprising:
   generating, by a signal generator, a code sequence for a plurality of transmitters configured to emit radar signals over a selected time frame, the code sequence including a plurality of codes, each code of the plurality of codes having a different code length, each code repeated in the code sequence according to a repetition frequency;
   simultaneously emitting a radar signal from each transmitter based on the code sequence, wherein the code length of a shortest code of the plurality of codes is selected to be greater than or equal to a number of the plurality of transmitters;
   detecting, by a receiver, return signals from reflections of the emitted radar signals; and
   estimating a property of an object based on the detected return signals.

10. The method of claim 9, wherein each code includes a series of associated symbols, and the code length is based on a number of the associated symbols.

11. The method of claim 10, wherein each code is generated by randomly or pseudo-randomly selecting the series of associated symbols.

12. The method of claim 10, wherein the number of the associated symbols shortest code of the plurality of codes is selected to be greater than or equal to the number of the plurality of transmitters.

13. The method of claim 9, wherein estimating the property includes transforming the detected return signals and generating a Doppler frequency spectrum.

14. The method of claim 13, wherein the Doppler frequency spectrum includes ambiguous frequency peaks for each transmitter, the ambiguous frequency peaks being separated due to the code sequence, and estimating the property includes identifying and disregarding the ambiguous frequency peaks.

15. A vehicle system comprising:
   a memory having computer readable instructions; and
   a processing device for executing the computer readable instructions, the computer readable instructions controlling the processing device to perform:

generating, by a signal generator, a code sequence for a plurality of transmitters configured to emit radar signals over a selected time frame, the code sequence including a plurality of codes, each code of the plurality of codes having a different code length, each code repeated in the code sequence according to a repetition frequency;

simultaneously emitting a radar signal from each transmitter based on the code sequence, wherein the code length of a shortest code of the plurality of codes is selected to be greater than or equal to a number of the plurality of transmitters;

detecting, by a receiver, return signals from reflections of the emitted radar signals; and estimating a property of an object based on the detected return signals.

16. The vehicle system of claim 15, wherein each code includes a series of associated symbols, the code length is based on a number of the associated symbols, and the code length is selected to be greater than a number of the plurality of transmitters.

17. The vehicle system of claim 16, wherein each code is generated by randomly or pseudo-randomly selecting the associated symbols.

\* \* \* \* \*